Patented July 27, 1943

2,325,105

UNITED STATES PATENT OFFICE 2,325,105

ADHESIVE COMPOSITION COMPRISING BISTHIOAMMELINE POLYALKYLENE ETHER RESINS

Herman A. Bruson and James L. Rainey, Philadelphia, Pa., assignors to The Resinous Products & Chemical Company, Philadelphia, Pa.

No Drawing. Application August 15, 1940, Serial No. 352,737

11 Claims. (Cl. 260—6)

This invention deals with improved adhesives based on the condensates of bisthioammeline polyalkylene ethers and formaldehyde. The preparation of these condensates has been described in application Serial No. 297,280, filed September 30, 1939, now U. S. Patent No. 2,217,667, of which the present application represents a continuation-in-part.

It has been found that solutions of the bisthioammeline polyalkylene ether-formaldehyde condensates together with acid-type catalysts are excellent adhesives and may be used for binding wood, cork, paper, cardboard, cloth, asbestos, sawdust, mineral pigments, animal, vegetable, or synthetic fibers, metal foil, or other substance to the same or a different material. Condensates of a bisthioammeline polyalkylene ether and formaldehyde may be used or condensates of a bisthioammeline polyalkylene ether, another methylol-forming compound, such as urea, thiourea, alkyl ureas, phenyl urea, urethane, formamide, acetamide, aryl sulfonamides, dicyandiamide, phenol, melamine, etc., and formaldehyde. There may also be used in the solution soluble blood, a thickening agent, a filler, or mixtures of these various adjuvants.

As described in the above-identified application a bisthioammeline polyalkylene ether of the formula

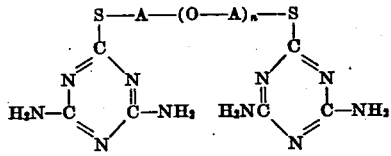

wherein A represents a lower alkylene group having at least two carbon atoms such as

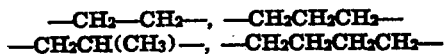

etc., and $n$ represents a small integer preferably from one to five inclusive, is condensed with an aldehyde, particularly formaldehyde, to yield valuable condensates. Formaldehyde may be used in the form of an aqueous or organic solvent solution or as a solid polymer. There may also be used in part as a source of formaldehyde hexamethylene tetramine or dimethylol urea. Furthermore, there may be used in conjunction with formaldehyde other aldehydes, such as benzaldehyde, acetaldehyde, furfural, etc. The bisthioammeline polyalkylene ether and formaldehyde and other aldehyde, if used, are best reacted in the presence of a solvent. When aqueous formaldehyde is used, the ether in powdered form is added to the formaldehyde solution. It dissolves as it reacts. When the pH of the reaction mixture is about neutral, stable condensation products are obtained. Stability and clarity of the solution of the condensate are also ensured by addition thereto of a small amount of a lower alcohol. The stability of solutions of condensates may also be improved by addition thereto of an alkaline earth salt, particularly calcium chloride, or magnesium chloride, in concentrations of 2% to 20% based on the weight of thioammeline ether or combined weight of thioammeline ether or combined weight of thioammeline ether and other methylol-forming compound.

The addition and condensation reactions of a bisthioammeline polyalkylene ether and formaldehyde are performed in a short time between 60° and 100° C. under atmospheric pressure. Higher pressures may be used when desired with a shortening of reaction time and without loss of formaldehyde. In general one mol of a bisthioammeline ether reacts with four to eight mols of formaldehyde. After the initial reaction, excess aldehyde may be removed by addition to the reacting mixture of further quantities of a thioammeline ether, or urea, thiourea, dicyandiamide, aniline, a primary or secondary amine, an amide of a mono- or poly-carboxylic acid, sulfonamide, phenol, melamine or other triazine, or other compound which reacts with formaldehyde to form a methylol derivative, so-called methylol-forming compounds. This in effect gives a co-condensate.

Equivalent effects in forming co-condensates are obtained by mixing bisthioammeline ether, another methylol-forming compound, and formaldehyde at the start of the reaction. Likewise, primary addition products or soluble condensates of a bisthioammeline ether and formaldehyde and primary addition products or soluble condensates of another methylol-forming compound and an aldehyde may be mixed. The final condensates or resins formed from these mixtures are also co-condensates.

The co-condensates which contain at least one part of a bisthioammeline ether-formaldehyde reaction product to one part of other resinous materials are unusually valuable for their stability, resistance to water, low water absorption, resistance to light, latitude in curing conditions, improved flow under pressure, etc. Yet the ratio may be carried to 1:3 with satisfactory results.

For the curing of the condensates based on bisthioammeline ethers there may be used a wide variety of acid-type catalysts. Conversion to advanced stages of condensation and polymerization is accelerated by acids, such as hydrochloric, phosphoric, acetic, formic, lactic, phthalic, maleic, chloroacetic, etc., acid salts, such as methylamine hydrochloride, sodium acid sulfate, etc., potentially acid salts, such as barium ethyl sulfate, ammonium thiocyanate, ammonium chloride, ammonium sulfate, alum, etc. For practical purposes the addition of free acids presents some difficulties in that there is danger of premature gelation and an acidified resin solution must be promptly applied, since it tends to gel very rapidly. Ammonium salts are highly useful as acid-type catalysts. They become effective apparently because ammonia therefrom is taken up by formaldehyde with the gradual liberation of acid. This sort of control may be further effected by addition to an acid-type catalyst of ammonia or ammonium hydroxide, which prolongs the spreading life of a solution of one of the bisthioammeline ether-aldehyde adhesives.

It is the preferred practise to add an acid-type catalyst to the solution of a bisthioammeline ether-aldehyde condensate at the time of use or shortly before the time of use of said condensate. When an adhesive solution is to be used during the course of a day, ammonia in conjunction with the acid-type catalyst prolongs the useful, working life thereof.

In the preparation of a mixture for use as an adhesive it is often desirable to add thereto one or more thickening agents, that is, materials which themselves thicken a solution of the condensates, such as a starch, walnut shell flour, or a cereal grain flour, such as rye or wheat flour. These materials may serve one or more purposes. For example, thickening agents increase the viscosity of the mix giving improved spreading properties, lessening penetration or permitting the use of condensates which in themselves do not impart sufficient viscosity to solutions but are otherwise satisfactory. These agents also reduce the cost of the adhesive composition and allow various economies in operation. As they increase the time for the spread adhesive to dry, they provide more flexible conditions for handling and applying adhesives.

There may also be used various finely divided extenders, or diluents such as diatomaceous earth, alpha-floc, wood-flour, etc. These materials are believed to act as fillers, increasing the viscosity of the mix, and helping to compensate for slight irregularities of surfaces. Such materials, however, do not necessarily add strength to the bond.

Another type of material which may be added to solutions of the bisthioammeline-aldehyde condensate is soluble blood. It is known that blood itself, or blood albumen, has some bonding action but this is less than that of the bisthioammeline-aldehyde condensates. The addition of blood, however, to a solution of a bisthioammeline polyalkylene ether-formaldehyde condensate yields an adhesive giving greater strength than either material alone. Since blood albumen is coagulated by heat in the curing operation, the high water-resistance of the bisthioammeline polyalkylene ether resins is not lessened. Furthermore, the use of blood with co-condensates of formaldehyde, a bisthioammeline polyalkylene ether, and another methylol-forming compound, particularly the open chain methylol-forming compounds such as urea or thiourea, is advantageous in that the strength and water-resistance from more economical mixtures are thus rendered similar to those obtained from the pure bisthioammeline polyalkylene ether-formaldehyde condensates. The bisthioammeline polyalkylene ether formaldehyde condensates and resins effectively prevent the blood or blood albumen from undergoing decay or putrefaction. Blood also has some thickening action on the mixture and thus serves as another type of thickening agent, increasing the flexibility of conditions in handling the adhesive compositions, preventing excessive penetration, etc.

In the application of an adhesive composition comprising a solution of a bisthioammeline polyalkylene ether-formaldehyde condensate and an acid-type catalyst for hardening the condensate, the composition is spread over the surface of objects to be bonded. The objects are then pressed together. Pressures up to several thousand pounds per square inch may be used. If cold-bonding is to be practised, an efficient catalyst is required and the parts to be joined are clamped together until the adhesive is set. The hardening step is much shortened and the maximum water-resistance of the adhesive developed by bonding at temperatures of 200° to 350° F.

Useful adhesive compositions and their preparations are described in the following examples.

*Example 1*

The following materials were mixed in a reaction vessel equipped with a stirrer:

| | Parts |
|---|---|
| $\beta,\beta'$-Bisthioammeline diethyl ether | 142 |
| 37% formaldehyde in ethyl alcohol | 191 |
| Ethyl alcohol (denatured) | 500 |

This mixture was heated under reflux for four hours and a clear solution formed with, however, some resinous material collecting on the walls of the reaction vessel. The solution was filtered and the clear filtrate (570 parts) was concentrated to 35% solids content by evaporation.

To 100 parts of this resin solution there was added four parts of a 40% aqueous solution of ammonium thiocyanate. The solution was spread on $\frac{1}{16}$" birchwood at the rate of 13 grams per square foot of surface to be joined. Three laminae were assembled and held for five minutes in a press heated with low pressure steam and operated at 200 lbs. per square inch. This plywood was highly water-resistant by the boiling water test, which failed to delaminate test samples.

A mixture of 100 parts of the above bisthioammeline diethyl ether-formaldehyde condensate and 100 parts of a commercial urea-formaldehyde plywood adhesive were mixed. Eight parts of a 40% solution of ammonium thiocyanate containing 5% ammonia was added. Three-ply veneers were bonded with this composition by the procedure described above. Comparison of these three-ply panels with similar panels from the commercial urea-formaldehyde adhesive alone were performed by boiling both kinds of panels in water. The panels with commercial urea-formaldehyde were delaminated in about 30–45 minutes. At this time the panels having the bisthioammeline ether resin in the adhesive were still intact.

*Example 2*

One mol of $\beta,\beta'$-bisthioammeline diethyl ether in powdered form was sifted into a warm aqueous 30% solution of six mols of formaldehyde. A small amount of soda ash was added to bring the pH of the solution between 6 and 7. The temperature of the solution was maintained at 70° C. for 15 minutes. A mixture was prepared from 100 parts of the solution of this condensate, 40 parts of wheat flour, and 4 parts of an aqueous 40% ammonium thiocyanate solution. The resulting paste was spread on 1/16" birchwood at 13 grams per square foot of surface and a three-ply sheet formed in a press at 200 lbs. per square inch and 220° F. for five minutes. The resulting panel was highly satisfactory in water-resistance as shown by the boiling water test. A urea-formaldehyde condensate mixed with flour and catalyst in the same proportions as for the above bisthioammeline ether adhesive was similarly applied to 1/16" birchwood veneer. At the time when these latter panels were completely delaminated by boiling water, the panels bonded with the bisthioammeline diethyl ether-formaldehyde mixture were entirely intact.

*Example 3*

486 parts of a 37% aqueous solution of formaldehyde was heated to 85° C. and 356 parts of powdered $\beta,\beta'$-bisthioammeline diethyl ether added with good stirring. The mixture was maintained at 85° C. until the thioammeline ether was completely dissolved. The pH of the resulting mixture was then adjusted to a value between 6 and 7 by additions of small amounts of soda ash solution and formic acid. The solution was then strained to remove any insoluble material and allowed to cool. Crystals separated, were broken up, washed with water, filtered off, and dried at about 40° C. This solid material corresponds approximately to the hexamethylol derivative and may be obtained in yields as high as 95% of theory.

100 parts of this methylol product, 100 parts of wheat flour, 2.5 parts of ammonium thiocyanate, and 100 parts of a solvent composed of half water and half ethanol were made into an adhesive paste. The adhesive was spread on 1/16" birchwood at the rate of 0.03 lb. per square foot. Three-ply veneers were formed in a press at 200 lbs. per square inch and 240° F. for five minutes. The resulting plywood had a shear strength of 320 lbs. per square inch.

*Example 4*

486 parts of 37% aqueous formaldehyde was heated to 85° C., and 356 parts of powdered $\beta,\beta'$-bisthioammeline diethyl ether gradually added over a period of about five minutes. The mixture was heated until the powdered material was practically all dissolved. The pH of the solution was then adjusted to a value between 6 and 7 and heating continued at 85° C. to 90° C. until there was a separation of two liquid phases. At this time the solution was subjected to reduced pressure and 180 parts of water removed while the temperature was maintained between 40° and 60° C. The water was replaced with ethyl alcohol in order to maintain a stable solution. The final solution, constituting 750 parts, had a solids content of 56% and a pH of 7.6.

There was added to 100 parts of the above solution 8 parts of a 25% alcoholic ammonium thiocyanate solution. This mixture was spread on birch veneer at 0.03 lb. per square foot and the laminae formed into a three-ply panel after a four minute treatment in a press at 200 lbs. per square inch and 240° F. The resulting plywood had a dry shear strength of 350 lbs. per square inch. Samples of the plywood were boiled in water for three hours without delamination and still had a dry shear strength of 340 lbs. per square inch.

*Example 5*

An adhesive was prepared by neutralizing 243 parts of an aqueous 37% formaldehyde solution with lime until a pH of 7.2 was reached, heating the neutralized solution to 85° C., stirring in 178 parts of powdered bisthioammeline diethyl ether over a period of about ten minutes, and then adding 3.25 parts of calcium chloride. The temperature was maintained between 85° C. and 90° C. until a critical solution temperature of 90° C. was reached; i. e., 90° C. was the lowest temperature at which the solution remained clear. The solution was then subjected to vacuum and 140 parts of water was distilled off at pressures between 100 and 20 mm. The residual mass was a thick paste which was taken up in 127 parts of ethyl alcohol to yield a homogeneous viscous solution of 66.7% solids and a viscosity of Z on the Gardner-Holdt scale.

In place of lime in the above example there may be used sodium hydroxide or soda ash with entirely satisfactory results, or the solution may be treated with activated charcoal. In place of the calcium chloride there may be used zinc chloride, magnesium chloride, or barium chloride likewise with satisfactory results. The above resinous solution may be further modified with extenders, thickeners, etc.

To the viscous solution as prepared above there was added about 4% of an aqueous 40% solution of ammonium thiocyanate. The resulting solution was spread on birch sheets at 12 grams per square foot and three-ply veneers formed at 200 lbs. per square inch pressure, 280° F., and press times of two to four minutes. The shear strength of the resulting panels varied from 300 to 500 lbs. per square inch. Samples subjected to boiling water for thirty minutes still exhibited shear strengths of at least 275 lbs. per square inch.

*Example 6*

195 parts of an aqueous 37% formaldehyde solution was heated in a reactor equipped with a reflux condenser to 80° C. and 35.6 parts of powdered $\beta,\beta'$-bisthioammeline diethyl ether and 54 parts of urea added with stirring. When solution was complete, the mixture was cooled to 60° C. and the pH adjusted between 6 and 7 with a little 10% aqueous soda ash solution. The temperature was then raised to 85–90° C. and maintained at this point until a viscosity between 75 seconds and 150 seconds, as measured at 25° C. in a Universal Saybolt viscosimeter, was reached. The temperature was then lowered to 50–60° C. and water removed under low pressure. When 80 to 110 parts of water had been removed, a viscous product was obtained which was highly satisfactory as a plywood adhesive. Upon addition of a small amount of an acid salt, an ammonium salt, or a mixture of acid-type catalyst and ammonia, the solution was ready for application.

In place of the urea used above, there may be added thiourea, in whole or in part, or other open-chain carbamide, such as urethane, formamide, acetamide, or alkyl or phenyl substituted urea. Also small amounts of calcium chloride, zinc chloride, magnesium chloride, etc. may be used in the reacting mixture.

The above condensates were combined with thickening agents, extenders, or blood to give highly useful adhesives. A mixture of 100 parts of the above condensate, 67 parts of water, 70 parts of wheat or rye flour, and 3 parts of ammonium sulfate was thoroughly stirred until a uniform paste was obtained. This mixture was used for bonding three-ply birchwood panels which showed shear strengths of 350 to 400 lbs. per square inch when freshly prepared and 325 to 360 lbs. per square inch after long exposure to water. The panels were not delaminated after five cycles of alternate wetting and drying.

Another mixture was made with 100 parts of condensate, 160 parts of water, 150 parts of wheat flour, 25 parts of soluble blood, and 3 parts of ammonium thiocyanate. Initial shear strength of three-ply birch panels bonded with this mixture was higher than the strength of panels bonded with a similar mixture without blood. Likewise, the panels bonded with the mix containing blood withstood more cycles of alternate wetting and drying, being intact after fifteen cycles, whereas without blood in the mixture failures began at about 10 cycles. Blood acts, therefore, not only as a thickener but also as a binding agent in conjunction with the bisthioammeline ether-formaldehyde condensates.

*Example 7*

An adhesive composition was prepared from 195 parts of aqueous 37% formaldehyde solution, 40 parts of bis(thioammelinoethoxy)ethylene, obtained by reacting two molecular proportions of thioammeline and one of dichlorotriethylene glycol, and 54 parts of urea by following the procedure described in Example 6. The viscous solution, treated with acid-type catalyst, provides a useful composition for binding cork in bottle caps, or in forming plywood. This condensate may likewise be mixed with thickening agents or blood.

The co-condensates of a bisthioammeline ether, an open chain carbamide, and formaldehyde are soluble and stable with little or no alcohol. This is advantageous when it is desired to use blood in the mixture, as too high concentrations of alcohol make it somewhat difficult to use blood.

We claim:

1. An adhesive comprising a solution of a condensate of a bisthioammeline ether and formaldehyde, an acidic condensation catalyst for hardening said condensate, and soluble blood.

2. An adhesive comprising a solution of a condensate of a bisthioammeline ether and formaldehyde, an acidic condensation catalyst for hardening said condensate, soluble blood, and a thickening agent.

3. An adhesive comprising a solution of a condensate of a bisthioammeline ether and formaldehyde, an acidic condensation catalyst, soluble blood, and a cereal grain flour.

4. An adhesive comprising a solution of a $\beta,\beta'$-bisthioammeline diethyl ether-formaldehyde condensates, acidic condensation catalyst for hardening said condensate, soluble blood, and wheat flour.

5. An adhesive comprising a solution of a condensate of $\beta,\beta'$-bisthioammeline diethyl ether, urea, and formaldehyde, an ammonium salt, soluble blood, and a cereal grain flour.

6. An adhesive comprising a solution of a condensate of $\beta,\beta'$-bisthioammeline diethyl ether, urea, formaldehyde, and an alkaline earth halide, an acidic condensation catalyst for hardening said condensate, soluble blood, and a cereal grain flour.

7. The process of bonding materials which comprises applying to objects to be bonded a solution containing a condensate of $\beta,\beta'$-bisthioammeline diethyl ether, another methylol-forming compound, and formaldehyde, soluble blood, and an ammonium salt, and pressing the objects together at temperatures between about 200° F. and about 350° F.

8. The process of bonding materials which comprises applying to objects to be bonded a solution containing a condensate of $\beta,\beta'$-bisthioammeline diethyl ether, an open-chain carbamide capable of forming a methylol derivative, and formaldehyde, soluble blood, and an ammonium salt and pressing the objects together at temperatures between about 200° F. and 350° F.

9. The process of bonding materials which comprises applying to objects to be bonded a solution containing a condensate of $\beta,\beta'$-bisthioammeline diethyl ether, urea, and formaldehyde, soluble blood, and an ammonium salt, and pressing the objects together at temperatures between about 200° F. and about 350° F.

10. The process of bonding plywood which comprises coating at least one surface of wood veneers with a solution containing a condensate of $\beta,\beta'$-bisthioammeline diethyl ether, urea, and formaldehyde, soluble blood, a cereal grain flour, an ammonium salt, and ammonia and pressing said coated veneers together at temperatures between about 200° F. and 350° F.

11. In a multi-ply structure wherein at least two wood laminae are bonded together, the improvement which resides in the bonding together of said laminae with an adhesive comprising a hardened bisthioammeline polyalkylene ether-formaldehyde condensate and blood.

HERMAN A. BRUSON.
JAMES L. RAINEY.